United States Patent [19]

Johnson et al.

[11] 4,063,905

[45] Dec. 20, 1977

[54] FUEL MIXER

[75] Inventors: Roy Henry Johnson; Donald K. Graham, both of Decatur, Ill.

[73] Assignee: Borg-Warner Corporation, Chicago, Ill.

[21] Appl. No.: 753,327

[22] Filed: Dec. 22, 1976

[51] Int. Cl.² ............................................. B01F 3/02
[52] U.S. Cl. ............................ 48/180 R; 48/180 C; 123/120; 123/141; 261/44 A
[58] Field of Search .............. 48/180 C, 180 R, 184; 123/120, 141; 261/44 A, 50 R

[56] References Cited

U.S. PATENT DOCUMENTS

| | | | |
|---|---|---|---|
| 1,611,347 | 12/1926 | Hartwell | 261/44 A |
| 4,020,810 | 5/1977 | Baverstock | 48/180 C |

*Primary Examiner*—S. Leon Bashore
*Assistant Examiner*—George C. Yeung
*Attorney, Agent, or Firm*—Herman E. Smith

[57] ABSTRACT

A gaseous fuel mixer for an internal combustion engine includes hinged air valve doors arranged for opening in accordance with manifold depression, the doors are linked to the fuel metering means and include means for ducting the gaseous fuel into the air stream. The air valve doors can be hinged flat along a surface of the air inlet to permit alternate use of a conventional gasoline carburetor.

9 Claims, 9 Drawing Figures

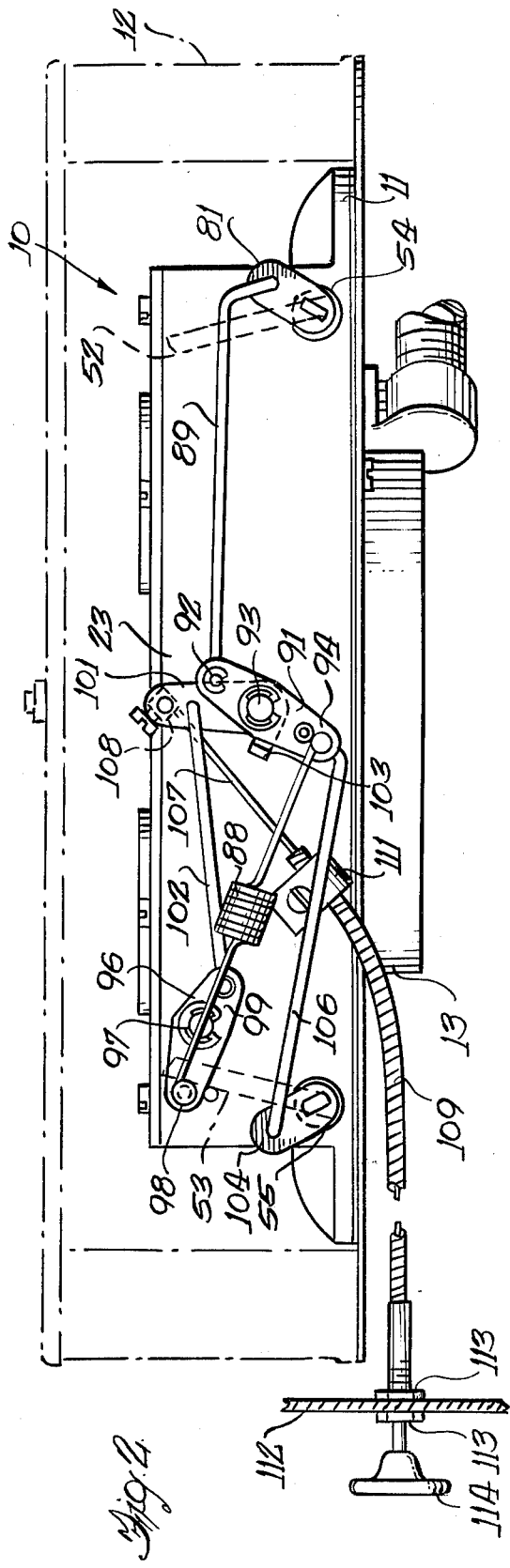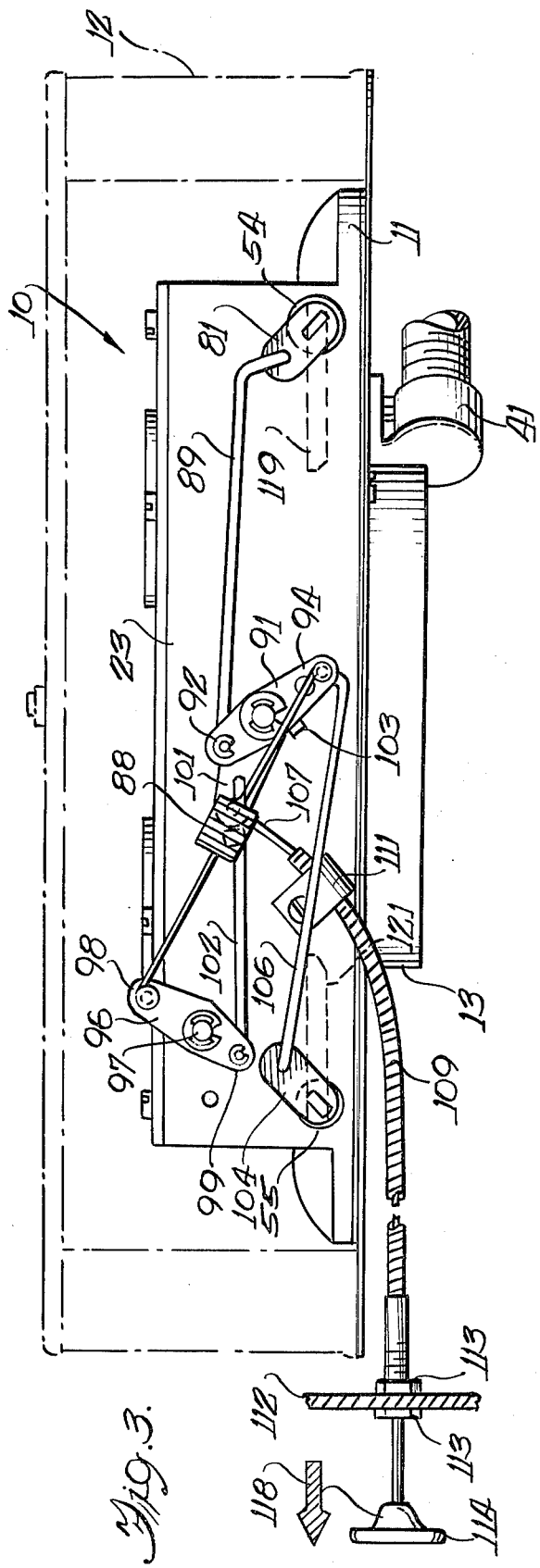

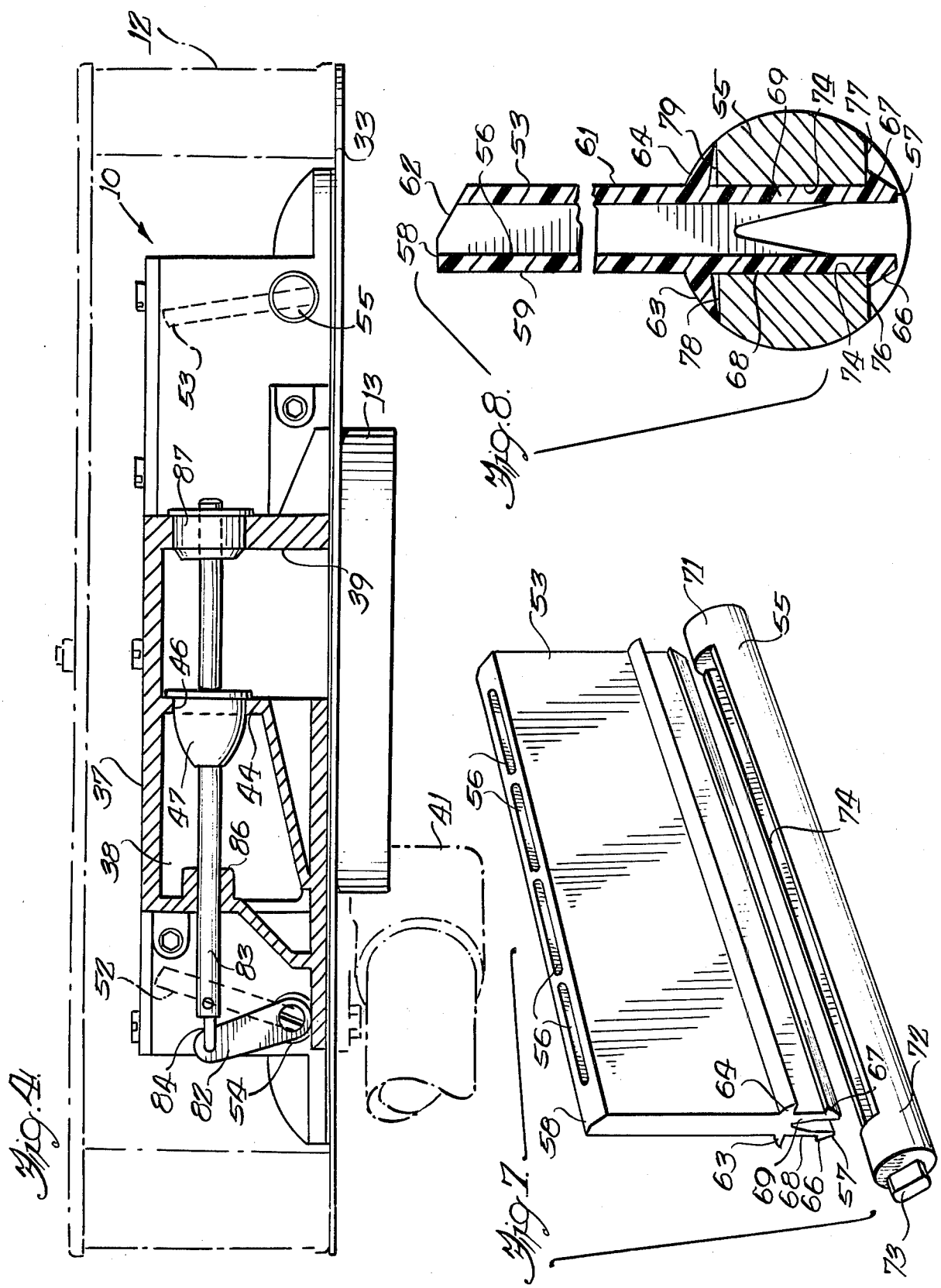

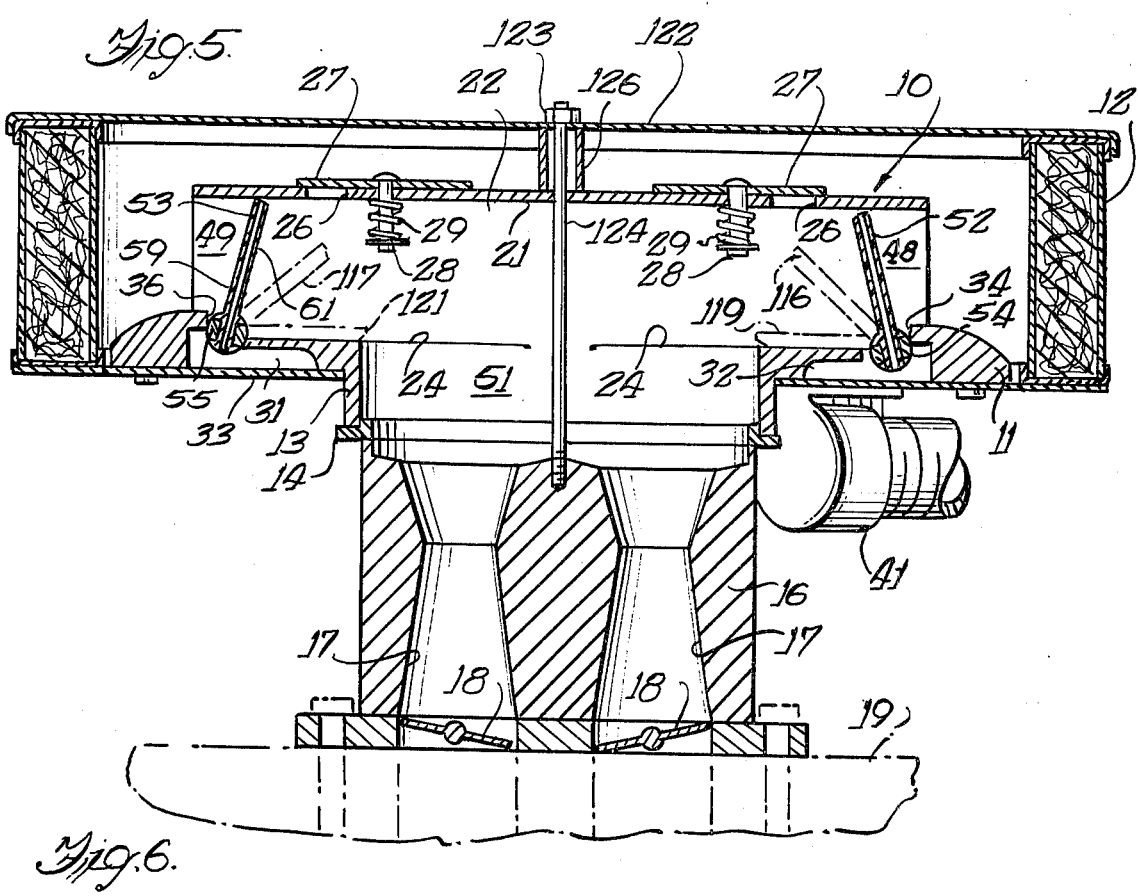
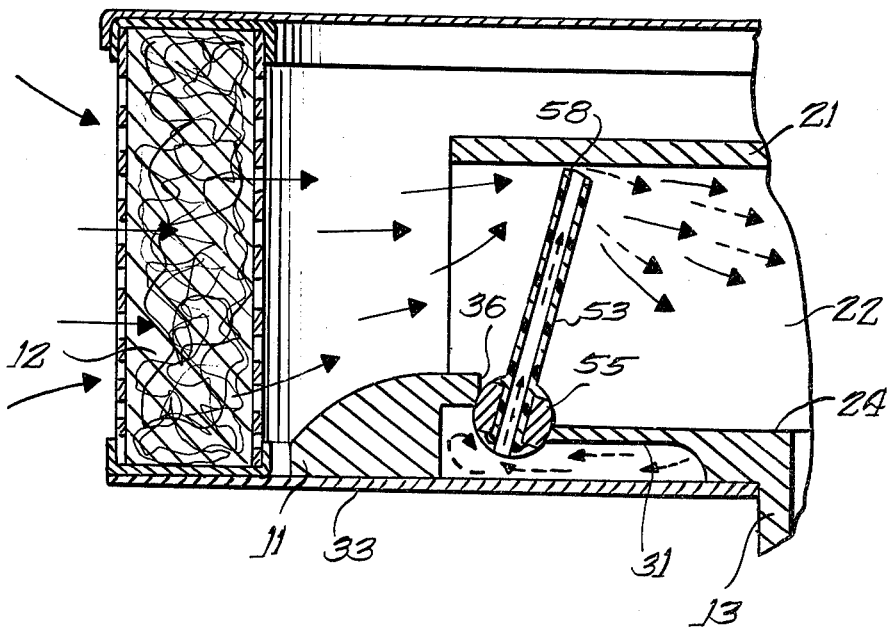

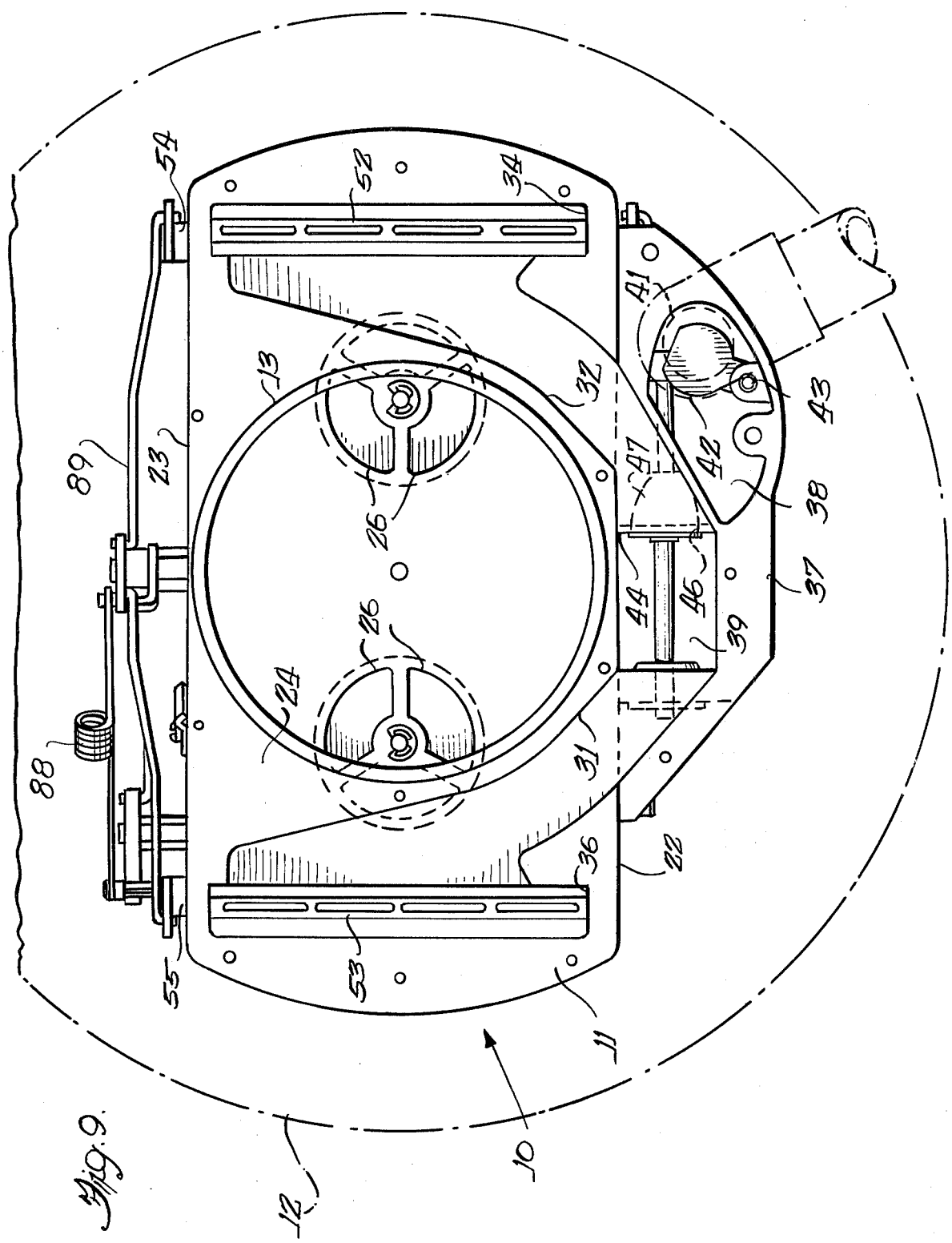

FUEL MIXER

BACKGROUND OF THE INVENTION

1. Field:

The present invention relates to a fuel mixer for an internal combustion engine which provides for mixing a gaseous fuel with an air stream. The mixer is capable of fitting within an annular air filter of the type used on motor vehicles. Further, the mixer can be used where it is desired to operate the engine solely on gaseous fuel or it can be used in tandem with a gasoline carburetor where it is desired to alternate between gaseous fuel and liquid gasoline fuel. The mixer is of the air valve type and includes provisions for moving the air valve apparatus to an inactive position when liquid gasoline fuel is being used.

2. Prior Art:

The prior art includes various examples of mixing devices for introducing a gaseous fuel into an air stream. Some of the prior art devices permit alternate selection of gaseous or liquid fuels and provide for moving an air restrictor when operation on liquid fuel is desired. Objection has been found with prior art devices in that the vertical dimension of the apparatus sometimes interferes with the hood of a motor vehicle, and in that the air restrictor used in the gaseous fuel mixer obstructs the air inlet so as to require recalibration of the gasoline carburetor.

SUMMARY OF THE INVENTION

The present invention relates to a fuel mixer for internal combustion engines in which a gaseous fuel is mixed with air to form an air-fuel charge. The mixer includes a hinged air valve door with means for introducing fuel into the air stream. The hinged air valve door provides a variable restriction in the air stream for locally increasing air velocity, while the fuel duct serves to introduce fuel into the high velocity zone of the air stream for improved mixing of fuel with air. Further, the mixer is of a compact configuration providing ample internal flow passages yet capable of fitting in an air filter of the type used in motor vehicles. The mixer may be mounted in tandem with a gasoline carburetor and includes provisions for displacing the air valve when the gasoline carburetor is in use. Further, the compact outer configuration and ample flow passages make it possible to employ the mixer with a wide variety of engines.

BRIEF DESCRIPTION OF THE DRAWINGS

FIG. 2 is a front elevation view of the fuel mixer of FIG. 1, showing portions of a control linkage in position for operation on a gaseous fuel mode;

FIG. 3 is a view comparable to FIG. 2 showing portions of a control linkage in position for locking out the gaseous fuel mode of operation;

FIG. 4 is a section view taken along the line 4—4 of FIG. 1 showing portions of a gaseous fuel metering means;

FIG. 5 is a section view taken along the line 5—5 of FIG. 1 showing internal passages and air valve doors of the mixer;

FIG. 6 is a fragmentary section view to enlarged scale, illustrating introduction of gaseous fuel into a high velocity zone of the air inlet passage;

FIG. 7 is an exploded perspective view of an air valve door with integral fuel duct and a hinge-like mounting shaft therefor;

FIG. 8 is a section view to enlarged scale of an air valve door secured to a mating hinge shaft; and FIG. 9 is a bottom plan view of the mixer with a lower cover removed revealing portions of the fuel passages.

DESCRIPTION OF THE PREFERRED EMBODIMENT

Figure 1:
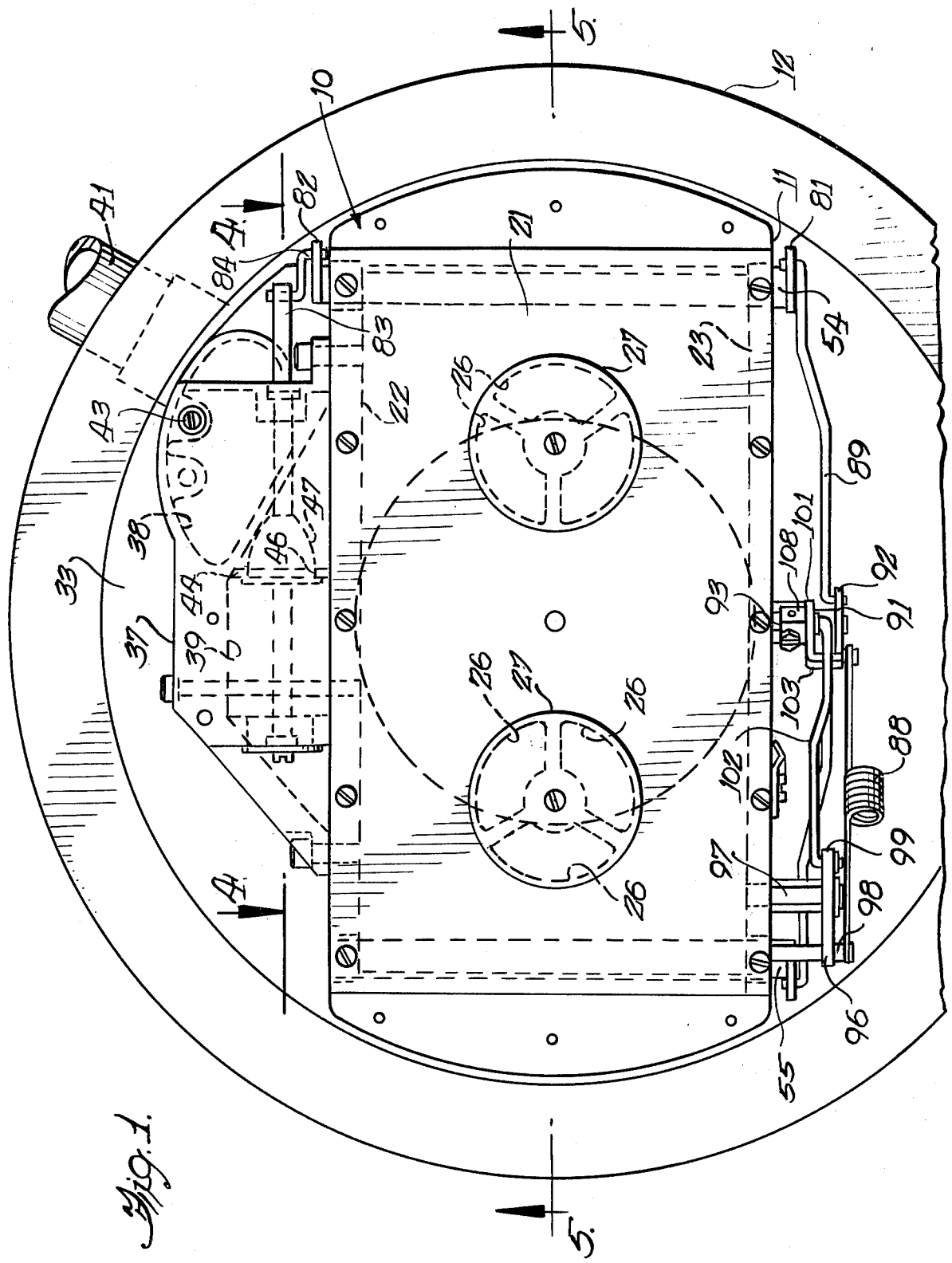
FIG. 1 is a top plan view of a fuel mixer according to the present invention, in the view, the upper cover plate has been removed in order to reveal portions of a control linkage.

Referring now to the drawings the gaseous fuel mixer 10 is described in more detail hereinafter. The body 11 is of a configuration for nesting in an annular air filter 12 of a type frequently used on motor vehicles, and includes an extension 13 for mounting the mixer in communication with the air induction passages of an internal combustion engine. An adaptor flange 14 is provided for supporting extension 13 on the member 16 which may be a conventional gasoline carburetor where alternate fuel usage is contemplated or may be a spacer where it is desired to operate only with gaseous fuel. The member 16 includes one or more passages 17 equipped with conventional throttle means 18 and is adapted for mounting on an inlet manifold 19 of an internal combustion engine not shown in the drawings. It is believed unnecessary to show an engine with fuel lines and control valves in the drawings, inasmuch as such devices are well known to those skilled in the art.

Body 11 includes an upper wall portion 21, a pair of sidewall portions 22, 23 and a bottom wall portion 24 which merges with extension 13. Upper wall portion 21 includes apertures 26 which are normally closed by pressure relief plates 27, 27. The pressure relief plates 27, 27 are mounted on upper wall portion 21 by means of pins 28, 28 and springs 29, 29. Normally, plates 27, 27 are biased into sealing engagement with wall 21 by means of springs 29, 29 thereby closing the apertures 26, however upon the occurrence of an over pressure condition within the body, the plates can move away from wall 21 thereby venting the interior of the body to atmosphere through the apertures 26.

Bottom wall 24 includes fuel recesses 31, 32 normally closed by lower cover plate 33 to form a portion of a more comprehensive inlet fuel passage. Elongated openings 34 and 36 extend through bottom wall portion 24 communicating fuel recesses 32, 31 with the interior of body 11.

A fuel regulating housing 37 is secured to an outer surface of wall portion 22 and includes an entry chamber 38 and a regulated chamber 39, the entry chamber 38 communicating with a source of gaseous fuel represented by the fitting 41 while the regulated chamber communicates with fuel recesses 31, 32. A restrictor mask 42 is mounted in entry chamber 38 for pivotal movement with respect to the opening in fitting 41. Restrictor mask 42 is secured to a rotatable adjusting screw 43 by which means the mask can be rotated for adjusting the flow rate of gaseous fuel from fitting 41 into entry chamber 38. A wall portion 44 of the fuel regulator housing 37 serves to separate entry chamber 38 from regulated chamber 39 and includes a metering aperture 46 in which a metering cone 47 is received whereby movement of the metering cone 47 with respect to the metering aperture 46 is effective to meter the flow of gaseous fuel from entry chamber 38 to regulated chamber 39 and fuel recesses 31, 32.

Upper wall portion 21, sidewall portions 22, 23, and bottom wall portions 24, 24 define an air inlet passage including a pair of arms 48, 49 extending in opposite directions from extension 13 which forms a common outlet passage 51. The elongated opening 34 permits communication of fuel from fuel recess 32 to air inlet arm 48, while elongated opening 36 permits communication of fuel from fuel recess 31 to air inlet arm 49.

An air valve door 52 is hingedly mounted in elongated opening 34 for pivotal movement toward and from upper wall portion 21 providing means for variably restricting air flow in arm 48 of the air inlet passage. A similar air valve door 53 is mounted in opening 36 for variably restricting air flow in arm 49 of the air inlet passage.

Air valve doors 52 and 53 are of similar construction, and are mounted in pivotal shafts 54, 55. The valve door 53 and its shaft 55 are shown to enlarged scale in FIGS. 7 and 8 and will be described in more detail as being typical of valve door 52 and shaft 54. The air valve door 53 has a configuration of a substantially rectangular panel and includes interior ducts in the form of channels 56, extending between a lower edge 57 and an upper distal edge 58. One face 59 of the panel faces upstream with respect to the air inlet passage while the other face 61 faces downstream of the air passage. The distal edge 58 of the air valve door 53 is beveled as at 62 to provide an opening from the channels 56 through the downstream face 61. Shoulders 63, 64 extend outwardly from faces 59 and 61 and are spaced from lower edge 57. The lower edge 57 of the panel is provided with clip portions 66, 67 extending outwardly in opposite directions from flexible leg portions 68, 69. Referring to the lower portion of FIG. 8, it is preferred to taper the outer edges of shoulders 63, 64 to form resilient cantilevered lips for snugly engaging shaft surfaces 78, 79.

Shaft 55 includes spaced trunnion portions 71, 72 adapted to be rotatably received in sidewalls 22, 23 of body 11. A flatted portion 73 extends outwardly from trunnion portion 72 for mounting a lever arm thereto. The shaft 54 includes flatted portions extending from each trunnion portion thereof inasmuch as lever arms are mounted on the opposite ends of shaft 54 while only a single lever arm is required for shaft 55.

Shaft 55 includes an elongated slotted opening 74 extending diametrically through the shaft and extending lengthwise between trunnion portions 71 and 72, providing means for securing air valve door 53 thereto. In order to releasably secure the door 53 to shaft 55, the clip portions 66, 67 are squeezed toward each other deflecting the flexible leg portions 68, 69, and inserted in the slot 74, 74. The leg portions are pushed through the slot such that the clips 66, 67 engage respective surfaces 76, 77 of the shaft while shoulders 63, 64 engage shaft surfaces 78, 79. It is preferable to form the air valve doors of a moldable synthetic resin which is resistant to deterioration from contact with petroleum based gaseous fuels.

A control linkage is shown in more detail in FIGS. 1, 2, 3 and 4. The pivotal shaft 54 which supports air valve door 52 is provided with levers 81, 82 secured to opposite ends thereof. The lever 82 is operatively connected to fuel metering cone 47 by means of rod 83 and link 84. As shown more clearly in FIG. 4, the rod 83 is secured to metering cone 47 and is slidable in boss 86 and bushing 87. Pivotal movement of air valve door 52 results in pivotal movement of lever 82 which acts on link 84 and rod 83 to move metering cone 47 with respect to metering aperture 46. The annular area between the cone and orifice regulates fuel flow rate in accordance with the position of air valve door 52. The position of air valve door 52, in turn, is determined by the rate of air flow in the inlet air passage 48.

The control linkage includes a resilient bias means in the form of tension spring 88. Lever 81 is connected by means of link 89 to one end 92 of a double lever 91 which is pivotally mounted between its ends on sidewall 23 by means of a stud-like projection 93. Air valve door 53 is connected to double lever 91 by means of shaft 55, lever 104 and link 106. The movement of air valve door 53 is synchronized with the movement of air valve door 52 by means of levers 81, 104, links 89, 106 and lever 91. A pivotal reaction member 96 is mounted on wall portion 23 by means of a stud-like projection 97. Bias spring 88 is connected between end 94 of lever 91 and 98 of reaction member 96. The other end 99 of reaction member 96 is connected to a shifting lever 101 by means of a link 102. Shifting lever 101 includes a finger 103 which is selectively engageable with double lever 91 for moving lever 91 from the position shown in FIG. 2 to the position shown in FIG. 3. A control wire 107 is connected to shifting lever 101 by means of wire connector 108. Control wire 107 is slideable in a flexible sheath 109 which is secured to the mixer sidewall by clamp 111, and to a control board 112 by means of lock nuts 113. A shifting knob 114 is secured to control wire 107 and is movable toward and from control board 112 for moving shifting lever 101 from one to the other of the positions shown in FIGS. 2 and 3.

When operation on the gaseous fuel mode is desired, shifting knob 114 is pushed toward control board 112 with the result that shifting lever 101 is moved to a substantially vertical position by means of wire 107. When shifting lever 101 is moved to the vertical position, link 102 pivots reaction member 96 about stud 97 thereby moving end 98 in a direction tending to stretch spring 88. The tension of spring 88 is applied to air valve doors 52 and 53 by means of lever 91, links 89, 106, levers 81, 104 and shafts 54, 55, biasing the doors toward the broken line position shown in FIG. 2 for closing air inlet passage arms 48, 49.

Referring to FIGS. 5 and 6, when the conventional throttle plates 18, 18 are opened during the gaseous fuel mode of operation, manifold depression is communicated through outlet passage 51 to the inner faces of air valve doors 52, 53 with the result that the valve doors swing in an opening direction as indicated by broken lines 116, 117 under the influence of atmospheric pressure. The degree of opening movement of the valve doors is determined by the tension of spring 88 and the degree of manifold depression communicated to the doors by means of throttle plates 18, 18. Pivotal movement of the air valve door causes the distal edge thereof 58 to move with respect to upper wall portion 21 thereby creating a restricted zone in the path of the incoming air which results in localized increase in air velocity. As indicated in FIG. 6, gaseous fuel is ducted through the air valve door 53 from fuel recess 31 into the air stream flowing over the distal edge 58 of the above door 53.

When it is desired to revert to operation on the liquid gasoline fuel mode, the shifting knob 114 is moved away from control board 112 as indicated by arrow 118 in FIG. 3. When control knob 114 is moved away from control board 112, the wire 107 pulls shifting lever 101 downwardly to a substantially horizontal position which causes finger 103 to engage double lever 91 turning lever 91 in a counterclockwise direction. Counterclockwise movement of lever 91 acts through links 89, 106, levers 81, 104 and shafts 54, 59 to move the air valve doors flat against lower wall portions 24, 24 as indicated by the broken line positions 119, 121 of FIGS. 3 and 5. The air valve doors are thus moved to an inactive position during operation on the liquid gasolene mode. The tension of spring 88 which normally biases the doors toward a closed condition, is removed from the doors in the inactive position by means of link 102, reaction member 96, and shifting lever 101. The counterclockwise movement of shifting lever 101 to the horizontal position which brings about counterclockwise movement of lever 91, also moves reaction member 96 by means of link 102 to an overcenter condition wherein the tension of spring 88 is relaxed between lever ends 98 and 94.

The above described gaseous fuel mixer can be advantageously employed for conversion of a motor vehicle for operation on gaseous fuel or where it is desired to alternate between the use of gaseous fuel and liquid fuel. An adapter flange 14 is placed above an existing gasolene carburetor 14 and the mixer 10 is placed on the flange and connected to a source of gaseous fuel indicated by the fitting 41. The air filter 12 is set in place around body 11 resting on lower plate 33. The upper cover 122 is placed over the air filter 12 and secured by means of a nut 123 and threaded rod 124. A spacer 126 can be employed to provide support for the central position of cover 122.

What is claimed is:

1. A fuel mixer for an internal combustion engine having an induction passage provided with a throttle member, said mixer including:
   a body having wall portions defining an inlet air passage, an inlet fuel passage, and a common outlet passage arranged for communication with each other, said common outlet passage being adapted for communication with said engine induction passage, said fuel inlet passage including a fuel recess disposed adjacent said air inlet passage communicating with said air inlet passage through a wall portion of said body, said fuel inlet passage further including movable fuel metering means arranged for regulating flow of fuel in said fuel recess, said air inlet passage including an air valve door pivotally mounted in said body for hinged movement toward and from a wall portion of said air inlet passage providing means for variably restricting air flow in said air inlet passage, said air valve door including means for ducting fuel from said fuel recess into said air inlet passage, and
   control linkage mounted on said body adjacent said air inlet passage connected to said air valve door and said fuel metering means, said control linkage including resilient bias means arranged for regulating movement of said valve door in accordance with manifold depression in said induction passage and further including operating means connected to said fuel metering means and said air valve door arranged for regulating movement of said fuel metering means in accordance with movement of said air valve door.

2. A fuel mixer according to claim 1, wherein said air valve door includes a fuel channel communicating with said fuel recess and said air inlet passage.

3. A fuel mixer according to claim 2, wherein said valve door includes a first edge portion pivotally mounted adjacent a first wall portion of said inlet air passage communicating with said fuel inlet passage, and a distal edge portion spaced from said first edge portion, said fuel channel extending between said first edge portion and said distal edge portion of said valve door.

4. A fuel mixer according to claim 3, wherein said distal edge portion of said valve door is movable in said air inlet passage for variably restricting air flow therein, said fuel channel including an opening adjacent said distal edge portion of air valve door.

5. A fuel mixer according to claim 2, including a pivotally movable shaft journalled in a wall portion of said body, said shaft extending along an opening between said air inlet passage and said fuel recess, said shaft including means for securing said valve door thereto.

6. A fuel mixer according to claim 5, wherein said shaft includes a slotted portion, said air valve door including a flexible clip portion engaging said shaft slotted portion.

7. A fuel mixer according to claim 1, wherein said control linkage includes shifting mechanism connected to said air valve door, said shifting mechanism including a lock-out lever selectively actuatable for moving said valve door to an inactive position substantially parallel to a wall of said air inlet passage.

8. A fuel mixer according to claim 7, wherein said shifting mechanism includes a movable reaction member engaging said resilient bias means, said reaction member being connected to said lock-out lever for movement therewith, said resilient bias means being moved to a relaxed position in response to movement of said air valve door to said inactive position.

9. A fuel mixer according to claim 1, wherein said inlet air passage includes a pair of arms extending laterally from said outlet passage, said air valve door being mounted in one arm of said air inlet passage, and having a second air valve door mounted in the other arm of said air inlet passage, said control linkage connecting said air valve door to said second air door for synchronous movement therewith.

* * * * *